US012089306B2

(12) United States Patent
Van Dijk et al.

(10) Patent No.: US 12,089,306 B2
(45) Date of Patent: Sep. 10, 2024

(54) DIRECT CURRENT, DC, VOLTAGE SOURCE ARRANGED FOR PROVIDING A DC VOLTAGE BASED ON AN INPUT VOLTAGE AS WELL AS A CORRESPONDING METHOD

(71) Applicant: SIGNIFY HOLDING B.V., Eindhoven (NL)

(72) Inventors: Bernhard Christiaan Van Dijk, Geldrop (NL); Paul Robert Veldman, Oss (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 164 days.

(21) Appl. No.: 17/792,223

(22) PCT Filed: Jan. 12, 2021

(86) PCT No.: PCT/EP2021/050420
§ 371 (c)(1),
(2) Date: Jul. 12, 2022

(87) PCT Pub. No.: WO2021/144233
PCT Pub. Date: Jul. 22, 2021

(65) Prior Publication Data
US 2023/0049832 A1 Feb. 16, 2023

(30) Foreign Application Priority Data
Jan. 16, 2020 (EP) .................................... 20152276

(51) Int. Cl.
*H05B 45/30* (2020.01)
*H05B 45/345* (2020.01)
*H05B 45/382* (2020.01)

(52) U.S. Cl.
CPC ......... *H05B 45/345* (2020.01); *H05B 45/382* (2020.01)

(58) Field of Classification Search
CPC ...... H05B 45/30; H05B 45/345; H05B 45/35; H05B 45/385; H05B 47/10; H02M 3/335; H02M 3/33507
See application file for complete search history.

(56) References Cited

U.S. PATENT DOCUMENTS 6,204,613 B1 3/2001 Hesterman
9,974,129 B1 5/2018 Xiong
(Continued)

FOREIGN PATENT DOCUMENTS

WO 2019030516 A1 2/2019

*Primary Examiner* — Jimmy T Vu

(57) ABSTRACT

A Direct Current, DC, voltage source arranged for providing a DC voltage based on an input voltage between two input terminals, wherein said DC voltage source comprises a transformer arranged for receiving a supply current, at a first side of the transformer, and for transforming said supply current to a circulating current at a second side of the transformer, a first and a second input terminal for receiving an input voltage for setting a DC voltage to be provided by said DC voltage source, a first diode, wherein an anode of said first diode is connected to a first end of said second side of said transformer, and wherein a cathode of said first diode is connected to said first input terminal, a current regulator circuit for assuring that an amount of current circulating current is shunted from the first diode.

9 Claims, 3 Drawing Sheets

(56) References Cited

U.S. PATENT DOCUMENTS

| | | | | |
|---|---|---|---|---|
| 10,362,653 | B1 | 7/2019 | Hittle | |
| 2008/0316785 | A1 | 12/2008 | Usui | |
| 2009/0196075 | A1 | 8/2009 | Arduini | |
| 2012/0044722 | A1* | 2/2012 | Cuk | H02M 3/335 363/21.03 |
| 2018/0235043 | A1 | 8/2018 | Chen et al. | |
| 2019/0059134 | A1 | 2/2019 | Lai et al. | |
| 2020/0177087 | A1* | 6/2020 | Warnes | H02M 1/08 |

* cited by examiner

DIRECT CURRENT, DC, VOLTAGE SOURCE ARRANGED FOR PROVIDING A DC VOLTAGE BASED ON AN INPUT VOLTAGE AS WELL AS A CORRESPONDING METHOD

CROSS-REFERENCE TO PRIOR APPLICATIONS

This application is the U.S. National Phase application under 35 U.S.C. § 371 of International Application No. PCT/EP2021/050420, filed on Jan. 12, 2021, which claims the benefit of European Patent Application No. 20152276.0, filed on Jan. 16, 2020. These applications are hereby incorporated by reference herein.

TECHNICAL FIELD

The present disclosure generally relates to the field of voltage interfaces for setting a Light Emitting Diode, LED, driver's output current and, more specifically, to a DC voltage source arranged for providing an accurate output voltage based on an input voltage.

BACKGROUND

A 1-10V or 0-10V interface is used in dimmable driver for light sources for many years now. Despite the inroad of digital interfaces these types of interfaces remain popular.

Next to its use as a dim interface, the 0-10V interface has become the de-facto standard for setting driver output current in US outdoor SSL drivers. The interface is there used as an alternative form of a set resistor, to match the driver output current to the lighting load used in the application. Contrary to when used in dimming applications, the driver may need to have an accurate, temperature independent and preferably linear transfer curve. Such a transfer curve is related to the relationship between the set resistor and for example an LED current.

The above described interface comprises a transformer for creating an isolation barrier between the driver side of the interface and the input side of the interface.

The transformer is energized, at a first side being the driver side, by injection or extraction of pulses of current. The current magnetically couples to a second side, being the input side of the transformer, and flows via a first diode, the set resistor and a further resistor back to the transformer. This secondary side current is called the circulating current.

The above described further resistor forms a part of a current regulator circuit, wherein the current regulator circuit assures that a predetermined amount of current flows via the set resistor. The current regulator assures that an excess current, i.e. the amount of current by which the circulating current exceeds the predetermined amount of current, is shunted such as not to flow through the set resistor. This is accomplished by providing a shunt path to the set resistor, i.e. an electrical path in parallel to the set resistor.

One of the downsides of the above described interface is that the transfer curve, as indicated above, becomes inaccurate by increasing amount of excess current. That is, the more excess current is to be shunted by the current regulator circuit, the more inaccurate the transfer curve becomes.

SUMMARY

It is an object of the present disclosure to provide for a Direct Current, DC, voltage source having an accurate transfer curve.

A further object of the present disclosure is directed to a method of operating such a DC voltage source.

In a first aspect, there is provided a Direct Current, DC, voltage source arranged for providing a DC voltage based on an input voltage between a first and a second input terminal, wherein said DC voltage source comprises:

- a transformer arranged for receiving a supply current, at a first side of the transformer, and for transforming said supply current to a circulating current at a second side of the transformer;
- said first and said second input terminal for receiving said input voltage for setting a voltage to be provided by said DC voltage source;
- a first diode, wherein an anode of said first diode is connected to a first end of said second side of said transformer, and wherein a cathode of said first diode is connected to said first input terminal;
- a current regulator circuit having two input nodes and one output nodes, wherein
  - a first of said input nodes is connected to said second input terminal,
  - a second of said input nodes is connected to said first end of said second side of said transformer and shunts said first diode as well as said first and second input terminal;
  - said output node is connected to a second end of said second side of said transformer,
- wherein said current regulator circuit is arranged for assuring that a predetermined amount of current is withdrawn from said circulating current, wherein said predetermined amount of current flows via said first diode, said first and second terminals and said first of said input nodes via said output node back to said transformer, and for assuring that a remaining current of said circulating current flows via said second of said input nodes, via said output node, back to said transformer thereby not flowing via said first node.

The inventors have found that it may be beneficial if the remaining current is also shunted before the first diode. As such, the remaining current will not flow through the first diode. Only the predetermined amount of current flows via the first and a second input terminal back to the transformer.

In the prior art, the excess current, i.e. the remaining current as indicated above, also flows through the first diode. It was found that the excess current that flows through the first diode is a cause of inaccuracy in the transfer curve. The excess current varies and decreases with increasing values for voltages over the terminals. This introduces a non-linearity and a temperature dependency in the transfer curve. This is explained in more detail with respect to the figures.

The excess current also varies substantially with variation of the magnetizing inductance of the transformer, which may have a relatively large tolerance and temperature dependency. The variation of the excess current that flows via the first diode caused by the variation in magnetizing inductance of the transformer is not a systematical error and can therefore not easily be compensated.

The present disclosure aims at providing a path for the excess current that does not involve the first diode. This is accomplished in that the second of said input nodes is connected to said first end of said second side of said transformer thereby shunting said first diode and said first and second input terminal. This reduces the non-linearity, temperature dependency and inaccuracy in the transfer curve.

In an example, the first and the second input terminals are arranged for receiving a resistor for setting the DC voltage to be provided by the DC voltage source.

In an example, the DC voltage source comprises a branch diode, wherein said second of said input nodes is connected to said first end of said second side of said transformer via said branch node.

The above may entail that the anode of the first diode and the anode of the branch diode are connected to each other.

In a further example, a forward voltage of said branch diode is equal to or lower than a forward voltage of said first diode.

The above ensures that the excess current flows via the second of said input nodes and thus not via the first diode.

In another example, said current regulator circuit comprises a current setting resistor, wherein a first end of said current setting resistor is connected to said first input node, and wherein a second end of said current setting resistor is connected to said output node, wherein said current regulator circuit is arranged to maintain a reference voltage over said current setting resistor such that a resistance value of said current setting resistor defines said predetermined amount of current flowing via said first of said input nodes.

The current regulator circuit may, for example, comprise a three-terminal adjustable shunt regulator.

In another example, the DC voltage source further comprises:

- a low-pass output filter connected to said first side of the transformer.

In a further example, the DC voltage source comprises:

- an output diode connected, directly or indirectly, to a first end of said first side of said transformer.

Here, the output diode and said first diode may have a same forward voltage drop.

More specifically, it may be beneficial if the first diode and the output diode are of the same type. Any non-linear effect of the first diode may then be corrected, or compensated, by the output diode. It is likely that such a compensation is most effective when both diodes are of the same type as in such a case it is likely that both diodes exhibit the same non-linear effects.

In a further example, said first and said second input terminal have received said resistor for setting said voltage to be provided by said DC voltage source.

It is noted that, in accordance with the present disclosure, the DC voltage source is often sold without a resistor for setting the voltage to be provided by the DC voltage source. The customer may actually provide the resistor between the terminals, or may, alternatively, provide for a voltage source having an output connected to the terminals, for setting the voltage.

In another example, the branch diode is a Schottky diode.

A Schottky diode, also known as Schottky barrier diode or hot-carrier diode, is a semiconductor diode formed by the junction of a semiconductor with a metal. It has a lower forward voltage drop and a faster switching action compared to regular diodes.

In a second aspect, there is provided a method for operating a Direct Current, DC, voltage source in accordance with any of the previous examples, wherein said method comprises the steps of:

- assuring, by said current regulator circuit, that said predetermined amount of current is withdrawn from said circulating current, wherein said predetermined amount of current flows via said first diode, said first and second terminal and said first of said input nodes via said output node back to said transformer, and
- assuring, by said current regulator circuit, that said remaining current of said circulating current flows via said second of said input nodes, via said output node, back to said transformer thereby not flowing via said first diode.

It is noted that the advantages and definitions as disclosed with respect to the embodiments of the first aspect of the invention also correspond to the embodiments of the second aspect of the invention, being the method of operating a Direct Current, DC, voltage source.

These and other aspects of the invention will be apparent from and elucidated with reference to the embodiment(s) described hereinafter.

DETAILED DESCRIPTION

Figure 1:
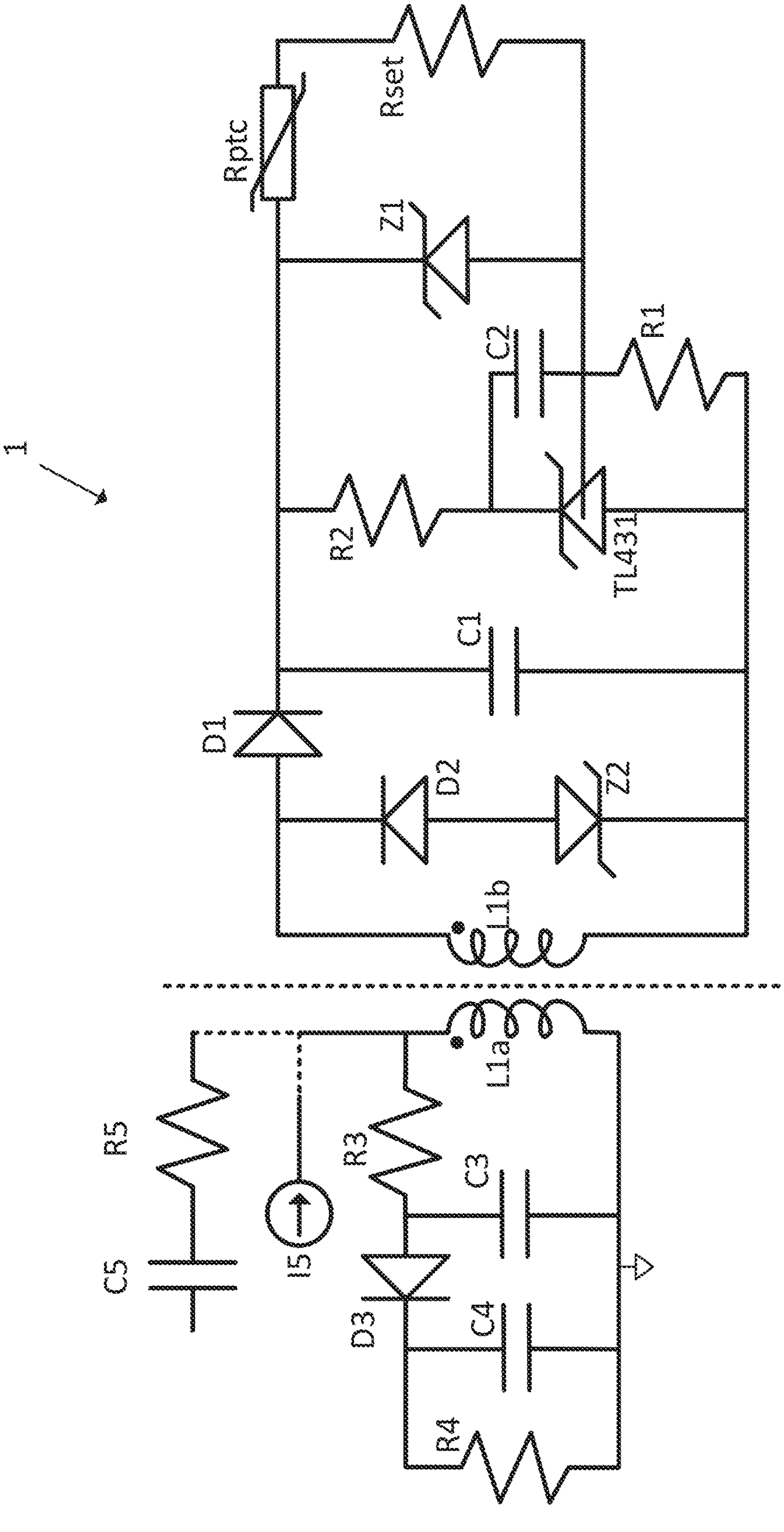
FIG. 1 discloses a Direct Current, DC, voltage source in accordance with the prior art.

FIG. 1 discloses a Direct Current, DC, voltage source 1 in accordance with the prior art. The electrical circuit shown in FIG. 1 is explained in more detail here below.

L1*a* is energized by at least positive pulses of current, e.g. via either C5, R5 or I5. This current magnetically couples to L1*b*, flows via D1, which is referred to as the first diode in accordance with the present disclosure, charges C1, and flows via Rptc, Rset and R1 back to L1*b*.

Here, Rset is the resistor received in between the input terminals and that sets the output voltage of the DC voltage source. The resistor R1 is the resistor that sets the predetermined amount of current. More specifically, the adjustable shunt regulator TL 431 is arranged to maintain a fixed voltage over R1, which fixed voltage, i.e. a reference voltage, is converted to a fixed, predetermined amount of current. The predetermined amount of current thus also flows through the resistor Rset.

If the voltage across R1 would exceed the TL431 reference voltage, the TL431 clamps the excess L1*b* current via R2, i.e. a low ohmic path, from its cathode into its anode. The R1 current is thus kept constant in this circuit, thereby ensuring that the output voltage, i.e. the voltage over R4, is based on the resistance value of Rset.

The above described excess current is thus the remaining current of the circulating current as described in the appending claims.

Rptc and Z1 are optional and if used typically, the Rptc resistance is very low compared to Rset. The voltage across L1*b* will therefore be equal to the D1 forward voltage, i.e. the forward voltage of the first diode, plus the voltage over Rset, plus the TL431 reference voltage across R1.

At the driver side, i.e. left from the insulation barrier provided by the transformer L1*a*/L1*b*, the L1*b* voltage is reflected across L1*a*, and is filtered by R3, C3 for the overshoot in L1*a* voltage due to the leakage inductance between L1*a* and L1*b*, and then rectified by D3, i.e. the output diode, into C4 in parallel with R4.

If L1*a* and L1*b* have a 1:1 turns ratio, the D3 Vbe forward voltage cancels the D1 Vbe forward voltage, and thus the driver-side voltage over R4 is a 1:1 representation of the input voltage and thus the Rset resistance, albeit it still includes an offset equal to the TL431 reference voltage.

After each positive current pulse, into the dot of L1*a*, the magnetization of L1 may need to be reset before the next positive current pulse, via a negative voltage, at the dot, across L1*a* and L1*b*.

D2 and Z2 provide a clamp to limit such reset voltage to a safe level. Clamping of the reverse voltage may also be done at the driver-side, or at both sides, and may be enhanced by a reverse current via C5, R5 or an optional reverse current of I5. An RC series network snubber may be provided, instead of D2, Z2.

The Rptc, Z1 circuit at the input side serves as a protection against inadvertently connecting the input terminals to the mains voltage. In such event, Z1 limits the voltage in either direction to safe levels, while Rptc rapidly becomes high-ohmic to robustly withstand the mains voltage.

It was found that, in the existing solution, the excess L1*b* current, which is clamped in the TL431, flows through the first diode, i.e. D1. It varies and decreases with increasing Rset, introducing a non-linearity and temperature dependency in the transfer curve, as the D1 and D3 forward voltages do no longer fully cancel.

The excess L1*b* current may also vary substantially with variation of the magnetizing inductance of the L1 transformer, which has a relatively large tolerance and temperature dependency. As the C5, R5 or I5 current is "fixed", and the L1 magnetizing current varies, the excess L1*b* current and the D1 current can vary substantially. The variation of D1 current due to the variation in magnetizing inductance is not a systematical error and can not easily be compensated.

The present disclosure is directed to split the sensing path of the L1*b* current from the excess current clamping path.

The sensing path provides an accurate, constant current that flows via the first diode, i.e. D1, via Rset and R1 and determines the L1*b* voltage as sensed across L1*a*; the L1*b* excess current flows via a separate branch and not via D1 into the TL431 clamp.

This substantially reduces the inaccuracy, non-linearity and temperature dependency in the Rset to the provided DC output voltage transfer curve.

Figure 2:
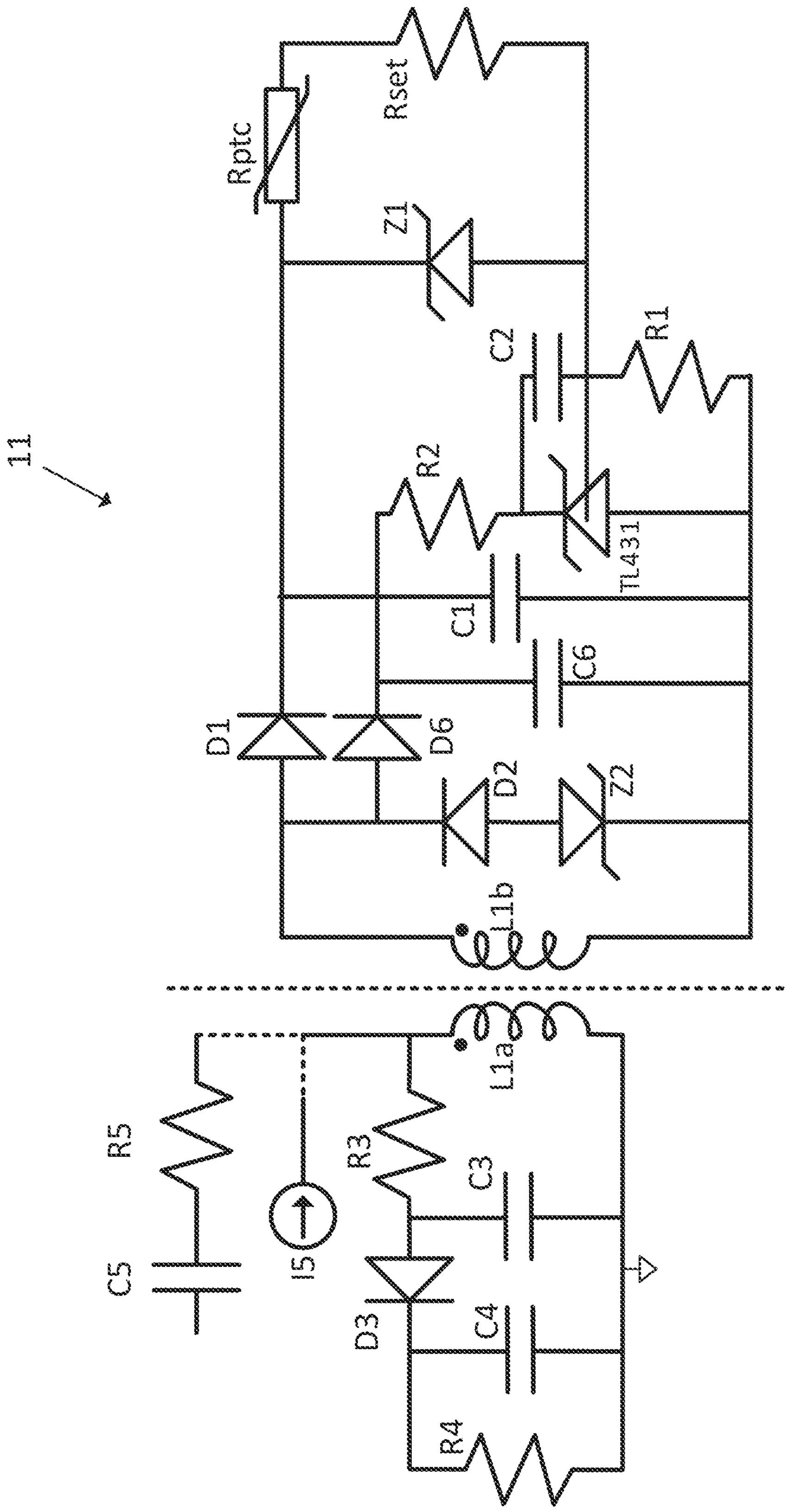
FIG. 2 discloses a Direct Current, DC, voltage source in accordance with the present disclosure.

FIG. 2 discloses a Direct Current, DC, voltage source 11 in accordance with the present disclosure.

The DC voltage source 11 is arranged for providing a DC voltage, i.e. over R4 in parallel with C4, based on a resistance value of a resistor, i.e. Rset. It is noted that the provided DC voltage is based on a voltage between two terminals, wherein the Rset may be received between those two terminals. Another option is that an output of a voltage source is connected to those two terminals.

The DC voltage source comprises:

- A transformer as indicated with the reference signs L1*a* and L1*b*, wherein the winding L1*a* is arranged for receiving a supply current and wherein the transformer is arranged for transforming the supply current to a circulating current at the winding L1*b*.

The supply current may be received from a current source as indicated with I5, or may originate from a voltage source via C5 and R5. The transformer further provides for an isolation barrier as indicated with the dotted lines for improving the safety aspects of the DC voltage source 11.

- A first and a second terminal for receiving an input voltage for setting a voltage to be provided by the DC voltage source. The terminals may, for example, be suitable for receiving a resistor by screwing the resistor to the terminals, by soldering the resistor to the terminals, by plugging the resistors in the terminals, or anything alike.

- A first diode, i.e. D1, wherein an anode of the first diode is connected to the first end of the second side of the transformer, and wherein a cathode of the first diode is connected to the first input terminal.
- A current regulator circuit, in this example in the form of an adjustable shunt regulator TL431, having two input nodes and one output node, wherein
  - a first of the input nodes is connected to the second input terminal;
  - a second of the input nodes is connected to the first end of the second side of the transformer thereby shunting the first diode and the first and second input terminal;
  - the output node is connected to a second end of the second side of the transformer.

Following the above, the current regulator circuit is arranged for assuring that a predetermined amount of current is withdrawn from said circulating current, wherein said predetermined amount of current flows via said first diode, said first and second terminal and said first of said input nodes via said output node back to said transformer, and for assuring that a remaining current of said circulating current flows via said second of said input nodes, via said output node, back to said transformer thereby not flowing via said first diode.

In this particular example, the second of the input nodes comprises a branch diode as indicated with D6, wherein the anode of the branch diode D6 is connected to the first end of the second side of the transformer.

The predetermined amount of current thus flows from the transformer via the first diode D1 and Rset and R1 back to the transformer. Resistor R1 is coupled between the first of said input nodes and the output node of the adjustable shunt regulator TL431. The remaining current, i.e. the excess current, flows from the transformer via the branch diode D6, through the optional resistor R2 and to the second input node of the adjustable shunt regulator TL431 via the output node of the adjustable shunt regulator TL431 back to the second side of the transformer.

In the circuit shown in FIG. 2, the Rptc, Rset and R1 current is constant and is the only current flowing via D1. Hence, the D1 current does not vary with Rset, the L1 magnetizing inductance or with temperature.

If the transfer curve needs to be accurate down to very low voltages, for example a near short of Rset, then the forward voltage of the branch diode D6 is preferably chosen lower than that of the first diode D1. In those cases, D1, and D3, are preferably Silicon diodes, while the branch diode D6 is then preferably a Schottky diode.

In an example, L1*a* is driven by a current source I5, delivering current pulses into L1*a*.

In an example, such I5 current source is voltage limited to a voltage level just above the voltage across L1*a* in case of the maximum voltage to be detected.

In a further example, the I5 current source does not extract current from L1*a*.

FIG. 2 depicts a driver-side detection positive with respect to the driver-side Gnd reference, and increases with increasing input voltage.

In an alternative implementation, L1*a* may not be referenced to Gnd, but e.g. to a low-voltage supply voltage, and the polarity of L1*a* may be reversed and the detected output signal across R4 decreases with increasing input voltage or Rset resistance.

Figure 3:
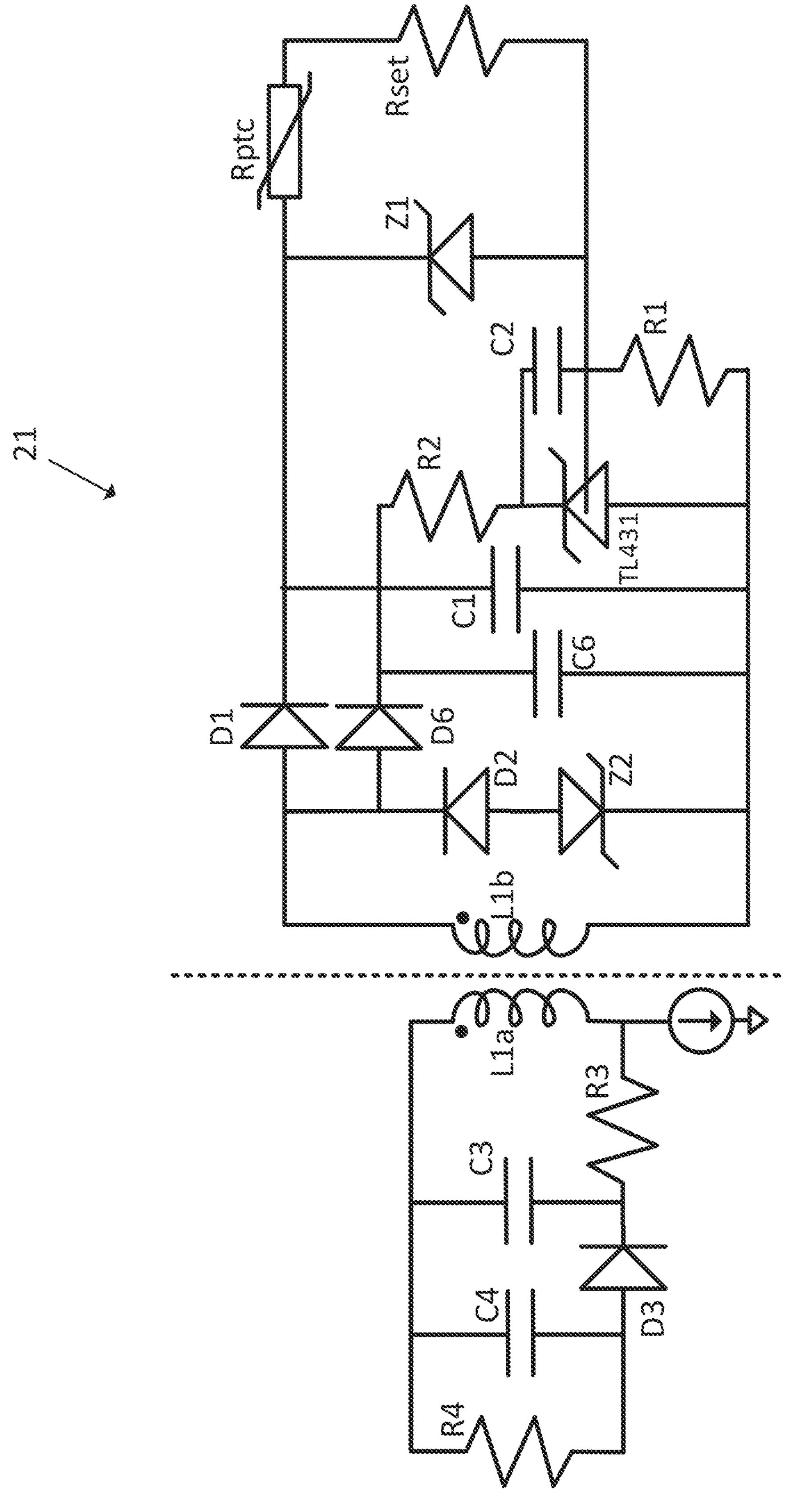
FIG. 3 discloses another Direct Current, DC, voltage source in accordance with the present disclosure.

FIG. 3 discloses another Direct Current, DC, voltage supply 21 in accordance with the present disclosure.

In an example, I5 extracts current from L1*a* and does not inject current during L1 magnetic reset. I5 may be a current source to Gnd, and may be integrated into an Integrated Circuit.

The output node as referred to in the description of the FIGS. 1, 2 and 3, is referred to as the anode side of the adjustable shunt regulator TL431. The excess amount of shunted current enters the adjustable shunt regulator via the cathode side, also referred to as the second input node, and leaves the current regulator via the anode side, also referred to as the output node, of the adjustable shunt regulator.

Other variations to the disclosed embodiments can be understood and effected by those skilled in the art in practicing the claimed invention, from a study of the drawings, the disclosure, and the appended claims. In the claims, the word "Comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope thereof.

The invention claimed is:

1. A Direct Current (DC) voltage source arranged for providing a DC voltage based on an input voltage between a first input terminal and a second input terminal, wherein a resistor is connectable between the first input terminal and the second input terminal, wherein said DC voltage source comprises:

a transformer arranged for receiving a supply current, at a first side of the transformer, and for transforming said supply current to a circulating current at a second side of the transformer;

said first and said second input terminal for receiving said input voltage for setting a DC voltage to be provided by said DC voltage source;

a first diode, wherein an anode of said first diode is connected to a first end of said second side of said transformer, and wherein a cathode of said first diode is connected to said first input terminal;

a branch diode, wherein an anode of said branch diode is connected to the first end of said second side of said transformer;

a current regulator circuit having an input node, a cathode side and an anode side, wherein:

said input node is connected to said second input terminal, said cathode side is coupled to said first end of said second side of said transformer via said branch diode and shunts said first diode as well as said first and second input terminal;

said anode side is connected to a second end of said second side of said transformer, wherein the DC voltage source further comprises a current setting resistor coupled between said input node and said anode side, wherein the current setting resistor is for setting a predetermined amount of current from said circulating current, wherein said current regulator circuit is arranged for assuring that the predetermined amount of current is withdrawn from said circulating current, wherein said predetermined amount of current flows via said first diode, said first and second terminal and said current setting resistor back to said transformer, and for assuring that a remaining current of said circulating current flows via said branch diode, via said cathode side, via said anode side, back to said transformer thereby not flowing via said first diode.

2. The DC voltage source in accordance with claim 1, wherein said first and said second input terminals are arranged for receiving a resistor for setting a DC voltage to be provided by said DC voltage source.

3. The DC voltage source in accordance with claim 1, wherein a forward voltage of said branch diode is equal to or lower than a forward voltage of said first diode.

4. The DC voltage source in accordance with claim 1, wherein said current regulator circuit is arranged to maintain a reference voltage over said current setting resistor such that a resistance value of said current setting resistor defines said predetermined amount of current flowing via said input node.

5. The DC voltage source in accordance with claim 1, further comprising a low-pass output filter connected to said first side of the transformer.

6. The DC voltage source in accordance with claim 5, further comprises an output diode connected, directly or indirectly, to a first end of said first side of said transformer.

7. The DC voltage source in accordance with claim 6, wherein said output diode and said first diode have a same forward voltage drop.

8. The DC voltage source in accordance with claim 1, wherein said branch diode is a Schottky diode.

9. A method for operating a Direct Current (DC) voltage source, wherein said method comprises:

assuring, by a current regulator circuit, that a predetermined amount of current is withdrawn from a circulating current, wherein said predetermined amount of current flows via a first diode, a first and second terminal and an input node via an anode side of the first diode back to a transformer, and assuring, by said current regulator circuit, that a remaining current of said circulating current flows via a cathode side of the first diode, via said anode side, back to said transformer thereby not flowing via said first diode.

* * * * *